(12) United States Patent
Frank et al.

(10) Patent No.: US 9,415,679 B2
(45) Date of Patent: Aug. 16, 2016

(54) FUEL-DISPENSING NOZZLE INHIBITOR

(71) Applicant: Stant USA Corp., Connersville, IN (US)

(72) Inventors: Louis T Frank, Connersville, IN (US);
Kevin L Young, Connersville, IN (US);
Mike W Boles, Springboro, OH (US)

(73) Assignee: Stant USA Corp., Connersville, IN (US)

( * ) Notice: Subject to any disclaimer, the term of this patent is extended or adjusted under 35 U.S.C. 154(b) by 211 days.

(21) Appl. No.: 14/222,224

(22) Filed: Mar. 21, 2014

(65) Prior Publication Data

US 2014/0284329 A1    Sep. 25, 2014

Related U.S. Application Data

(60) Provisional application No. 61/905,447, filed on Nov. 18, 2013, provisional application No. 61/804,528, filed on Mar. 22, 2013.

(51) Int. Cl.
*B60K 15/04* (2006.01)
*B60K 15/03* (2006.01)

(52) U.S. Cl.
CPC . *B60K 15/03006* (2013.01); *B60K 2015/03019* (2013.01); *B60K 2015/0483* (2013.01)

(58) Field of Classification Search
CPC ........... B60K 15/04; B60K 2015/0429; B60K 15/0461; B60K 15/0483; B60K 15/03006; B60K 2015/03019
USPC .......................... 141/348–350; 220/86.2–86.3
See application file for complete search history.

(56) References Cited

U.S. PATENT DOCUMENTS

| | | | |
|---|---|---|---|
| 765,493 A | 7/1904 | Koscinski |
| 3,730,216 A | 5/1973 | Arnett et al. |
| 4,034,784 A | 7/1977 | Ball et al. |
| 4,248,279 A | 2/1981 | Warmbold |
| 4,526,216 A | 7/1985 | Lake, Jr. |
| 4,687,034 A | 8/1987 | Graiff et al. |
| 5,145,081 A | 9/1992 | Gravino |
| 5,212,864 A | 5/1993 | Bates et al. |
| 5,322,100 A | 6/1994 | Buechler et al. |
| 5,385,179 A | 1/1995 | Bates et al. |
| 5,439,129 A | 8/1995 | Buechler |
| 5,465,861 A | 11/1995 | Kunz et al. |
| 5,715,963 A | 2/1998 | Boll et al. |
| 5,738,359 A | 4/1998 | Gundy |
| 6,152,455 A | 11/2000 | Brockway et al. |
| 6,302,169 B1 | 10/2001 | Pulos |

(Continued)

OTHER PUBLICATIONS

International Search Report and Written Opinion for International Application No. PCT/US2014/031423, Aug. 19, 2014, 7 pages.

(Continued)

*Primary Examiner* — Nicolas A Arnett
(74) *Attorney, Agent, or Firm* — Barnes & Thornburg LLP (57) ABSTRACT

A nozzle inhibitor is adapted to be arranged in a filler neck included in a fuel tank fill tube and is configured to allow only a diesel fuel nozzle having an outer diameter that is greater than a specified minimum diameter to be inserted into the fill tube to a depth sufficient so that a user may dispense diesel fuel from that nozzle into the fill tube. The nozzle inhibitor inhibits insertion of a small-diameter unleaded fuel nozzle into the fill tube, yet allows insertion of a large-diameter diesel fuel nozzle into the fill tube so that only diesel fuel is dispensed into a diesel fuel tank coupled to the fill tube.

20 Claims, 8 Drawing Sheets

(56) References Cited

U.S. PATENT DOCUMENTS

| | | |
|---|---|---|
| 6,325,233 B1 | 12/2001 | Harris |
| 6,382,270 B1 | 5/2002 | Gzik |
| RE37,776 E * | 7/2002 | Foltz .................. B60K 15/04 |
| | | 141/325 |
| 6,539,990 B1 | 4/2003 | Levey et al. |
| 6,607,014 B2 | 8/2003 | Webb |
| 6,923,224 B1 | 8/2005 | McClung et al. |
| 6,968,874 B1 | 11/2005 | Gabbey et al. |
| 6,994,130 B1 | 2/2006 | Gabbey et al. |
| 7,077,178 B2 | 7/2006 | Hedevang |
| 7,182,111 B2 | 2/2007 | McClung et al. |
| 7,293,586 B2 | 11/2007 | Groom et al. |
| 7,302,977 B2 | 12/2007 | King et al. |
| 7,665,493 B2 | 2/2010 | Groom et al. |
| 7,967,041 B2 | 6/2011 | Groom et al. |
| 7,967,042 B2 | 6/2011 | Groom et al. |
| 8,596,315 B2 * | 12/2013 | Muller ............... B60K 15/0406 |
| | | 141/312 |
| 8,763,656 B2 * | 7/2014 | Ichimaru ................ B60K 15/04 |
| | | 141/350 |
| 2002/0020465 A1 | 2/2002 | Gzik |
| 2002/0170622 A1 | 11/2002 | Webb |
| 2004/0025967 A1 | 2/2004 | Henry |
| 2005/0000592 A1 | 1/2005 | Bartlett |
| 2006/0032552 A1 | 2/2006 | Hedevang |
| 2006/0096662 A1 | 5/2006 | King et al. |
| 2006/0237472 A1 | 10/2006 | Martin et al. |
| 2006/0289084 A1 | 12/2006 | Groom et al. |
| 2007/0000574 A1 | 1/2007 | DeCapua et al. |
| 2007/0034287 A1 | 2/2007 | Groom et al. |
| 2007/0251598 A1 | 11/2007 | Nakazawa et al. |
| 2008/0178962 A1 | 7/2008 | Baudoux et al. |
| 2010/0132838 A1 | 6/2010 | Cisternino et al. |
| 2010/0175785 A1 * | 7/2010 | Groom .................. B60K 15/04 |
| | | 141/350 |
| 2010/0218849 A1 | 9/2010 | Hagano |
| 2011/0079322 A1 * | 4/2011 | Beier ................ B60K 15/0406 |
| | | 141/350 |
| 2011/0139779 A1 * | 6/2011 | Muller ............... B60K 15/0406 |
| | | 220/86.2 |
| 2011/0214783 A1 * | 9/2011 | Ichimaru ................ B60K 15/04 |
| | | 141/381 |
| 2014/0332530 A1 * | 11/2014 | Groom .................. B60K 15/04 |
| | | 220/86.2 |

OTHER PUBLICATIONS

PCT International Search Report and Written Opinion completed by the ISA/US on Jul. 27, 2014 and issued in connection with PCT/US2014/031423.

\* cited by examiner

FUEL-DISPENSING NOZZLE INHIBITOR

PRIORITY CLAIM

This application claims priority under 35 U.S.C. §119(e) to U.S. Provisional Application Ser. No. 61/905,447, filed Nov. 18, 2013, and U.S. Provisional Application Ser. No. 61/804,528, filed Mar. 22, 2013, which are both expressly incorporated by reference herein.

BACKGROUND

The present disclosure relates to a fuel tank fill tube, and more particularly to a device for preventing the introduction of a nozzle for unleaded fuel into the fill tube of a fuel tank of a motor vehicle fitted with a diesel internal combustion engine.

Unleaded fuel should not be introduced into a fill tube of a motor vehicle powered by a diesel engine. It is customary to use a small-diameter fuel-dispensing nozzle (e.g., 21.5 mm or less) to dispense unleaded fuel into a fuel tank fill tube and to use a large-diameter fuel-dispensing nozzle (e.g., 23.5 mm or more) to dispense diesel and leaded fuel into a fuel tank fill tube.

SUMMARY

A nozzle inhibitor is adapted to be arranged in a fuel tank fill tube and is configured to allow only a diesel fuel nozzle having an outer diameter that is greater than a specified minimum diameter to be inserted into the fill tube to a depth sufficient so that a user may dispense diesel fuel from that nozzle into a diesel fuel tank coupled to the fill tube. Such a nozzle inhibitor inhibits insertion of a small-diameter unleaded fuel nozzle into the fill tube of a diesel fuel tank, yet allows a large-diameter diesel fuel nozzle to be inserted into the fill tube of the diesel fuel tank.

In illustrative embodiments, the fill tube includes a filler neck coupled to the diesel fuel tank and a filler neck closure assembly coupled to the filler neck. The nozzle inhibitor is included in the filler neck closure assembly.

In illustrative embodiments, the nozzle inhibitor includes a flapper door lock comprising rotatable first and second lock rings arranged to rotate about a central axis extending through the filler neck closure assembly. Each lock ring is formed to include door-motion blockers extending inwardly from a frame ring and a plurality of tab-passing slots arranged circumferentially between the door-motion blockers. When both the first lock ring and the second lock ring are moved to an unlocked position, the slots of each lock ring are aligned with each other so that retainer tabs included in a flapper door can pass through the slots as the flapper door moves from a closed position blocking a small-diameter unleaded fuel nozzle from being inserted past the flapper door to an opened position allowing a large-diameter diesel fuel nozzle to be inserted past the flapper door.

In illustrative embodiments, the nozzle inhibitor also includes a door lock opener comprising a first set and a second set of band movers that are mounted on a guide housing for independent pivotable movement relative to one another. Actuation of the first set of band movers by a fuel nozzle pushing the band movers outwardly causes the first lock ring to pivot to the unlocked position and actuation of the second set of band movers by a fuel nozzle pushing the band movers outwardly causes the second lock ring to pivot to the unlocked position. Only a large-diameter (diesel) fuel-dispensing nozzle can actuate both the first and second set of band movers included in the door lock opener. A relatively smaller small-diameter (unleaded) fuel-dispensing nozzle, in contrast, is not wide enough at the tip to actuate (spread apart) both the first and second set of band movers included in the door lock opener. As such, the door-motion blockers continue to engage (i.e., confront) the retainer tabs of the flapper door to retain the flapper door in a closed position blocking passage of the small-diameter nozzle through the filler neck closure assembly past the flapper door so that unleaded fuel cannot be dispensed into the diesel fuel tank.

Additional features of the disclosure will become apparent to those skilled in the art upon consideration of the following detailed description of illustrative embodiments exemplifying the best mode of carrying out the disclosure as presently perceived.

BRIEF DESCRIPTION OF THE DRAWINGS

The detailed description particularly refers to the following figures in which:

FIG. 4 is an exploded perspective assembly view of the illustrative fuel nozzle inhibitor included in FIG. 3 showing that the movable flapper door includes a door plate adapted to be coupled to a lower mount to pivot about a nozzle-inhibitor door axis, a first door position retainer having a pair of retainer tabs, and a second door-position retainer having a pair of retainer tabs, showing that the flapper door lock includes a first lock ring, a second lock ring, a first ring position changer having a first ring rotator and a first wire band, and a second ring position changer having a second ring rotator and a second wire band, and showing that the door lock opener includes a first set of band movers adapted to be coupled to an upper mount to pivot relative to the upper mount to push the first wire band included in the first ring rotator outwardly in response to insertion of a large-diameter diesel fuel nozzle into the fuel nozzle inhibitor, as shown in FIGS. 7 and 8, and a second set of band movers adapted to be coupled to an upper mount to pivot relative to the upper mount to push the second wire band included in the second ring rotator outwardly in response to insertion of a large-diameter (diesel) fuel nozzle into the fuel nozzle inhibitor as shown in FIGS. 7 and 8;

FIG. 7 is a view similar to FIGS. 5 and 6 of the fuel nozzle closure assembly and a tip of a large-diameter (diesel) fuel nozzle inserted further into the filler neck closure assembly than in FIG. 6 to show engagement of the large-diameter (diesel) fuel nozzle with sloped ramps formed by the first and second sets of band movers and urge the band movers to slide in radially outward directions to expand the elastic deformable first and second wire bands and cause the companion ring rotators to move so as to rotate the lock rings to unlock the flapper door lock by aligning slots in the first and second lock rings as shown in FIG. 7A which allows retainer tabs included in the flapper door to pass through the door lock during movement of the flapper door from the closed position to the open position as shown in FIG. 8;

DETAILED DESCRIPTION

Figure 1:
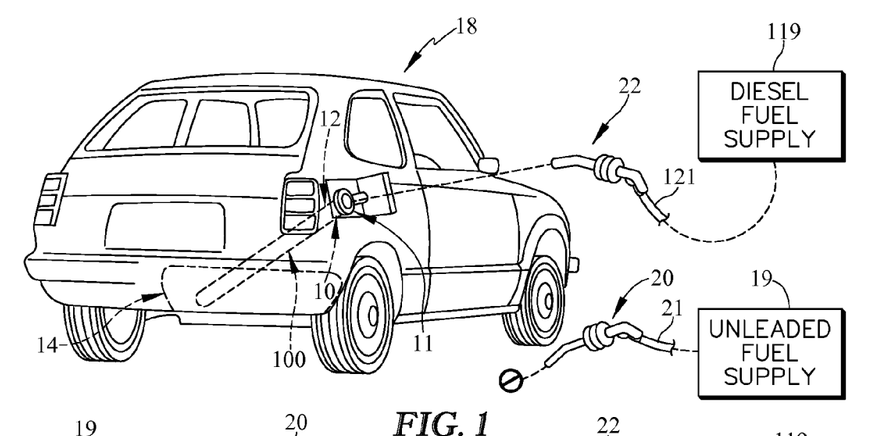
FIG. 1 is a perspective view of a diesel-engine vehicle provided with a capless fuel tank fill tube showing an outer filler neck access door moved to an opened position relative to a vehicle body panel to expose an illustrative capless filler neck closure assembly coupled to a filler neck (shown in phantom) leading to a vehicle fuel tank (also shown in phantom), showing a large-diameter (diesel) fuel-dispensing nozzle coupled to a diesel fuel supply and configured to be inserted into the filler neck closure assembly during vehicle refueling to discharge liquid diesel fuel into the filler neck leading to the vehicle fuel tank, and showing a small-diameter (unleaded) fuel-dispensing pump nozzle that is not authorized for use to refuel the diesel-engine vehicle fuel tank.
Figure 2:
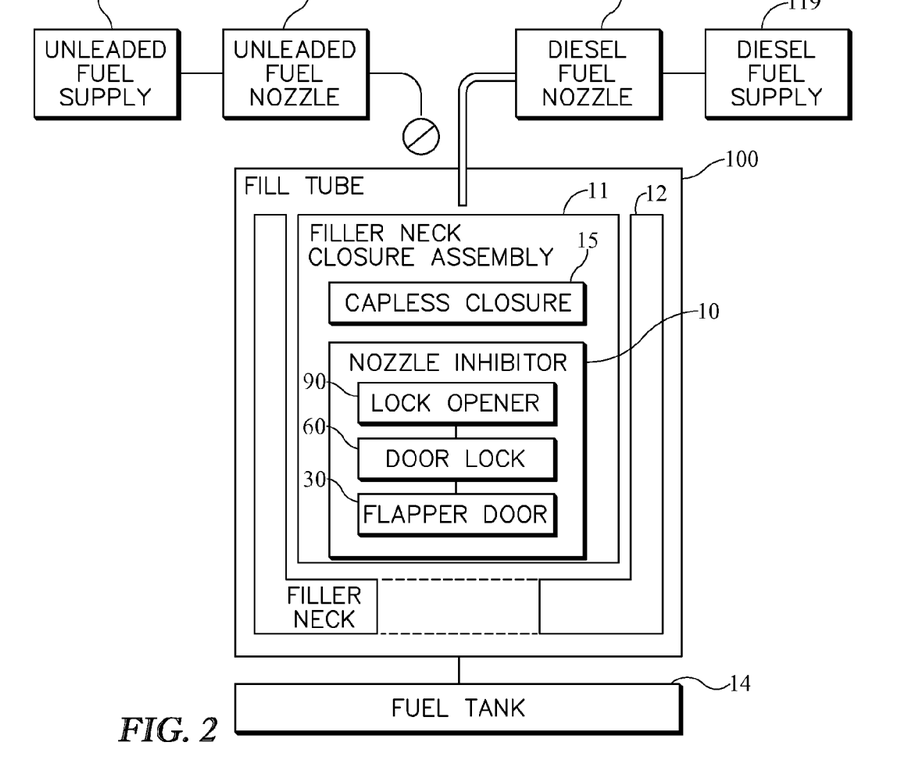
FIG. 2 is a diagrammatic view of a filler neck closure assembly in accordance with the present disclosure showing that an unleaded fuel nozzle inhibitor is located in a fuel tank fill tube and formed to include a movable flapper door, a flapper door lock, and a door lock opener and suggesting that the unleaded fuel nozzle inhibitor is configured to provide inhibitor means for preventing insertion of a small-diameter unleaded fuel-dispensing pump nozzle into a fuel-conducting passageway formed in a filler neck included in the fuel tank fill tube and coupled to a vehicle fuel tank while allowing insertion of a large-diameter diesel fuel-dispensing pump nozzle into the fuel-conducting passageway formed in the filler neck.

A nozzle inhibitor 10 is adapted to be mounted in a filler neck 12 to prevent use of a small-diameter (unleaded) fuel-dispensing nozzle 20 in a diesel-engine vehicle 18 as suggested in FIGS. 1 and 2. Nozzle inhibitor 10 is configured to block insertion of small-diameter (unleaded) fuel-dispensing nozzle 20 into filler neck 12 past nozzle inhibitor 10 so that a user cannot dispense non-diesel unleaded fuel into diesel-engine vehicle 18. Nozzle inhibitor 10 is further configured to allow insertion of a large-diameter (diesel) fuel-dispensing nozzle 22 into filler neck 12 past nozzle inhibitor 10 so that a user can dispense diesel fuel into diesel-engine vehicle 18. Nozzle inhibitor 10 is also suitable for use in a traditional fill tube closed by a fuel (gas) cap.

As shown diagrammatically in FIG. 2, a filler neck closure assembly 11 includes a capless outer closure 15 and nozzle inhibitor 10 which are both mounted in filler neck 12 to provide a capless fill tube 100. Capless filler neck 12 forms a nozzle-receiving passageway 12P that communicates with a vehicle fuel tank 14. Capless outer closure 15 provides an initial covering for filler neck 12 and is adapted to block dirt and other foreign objects from entering filler neck 12. Nozzle inhibitor 10 prevents a fuel-purchasing customer from using a small-diameter (unleaded) fuel-dispensing nozzle 20 to discharge unleaded fuel into a vehicle 18 having a diesel engine (not shown) requiring only diesel fuel.

Small-diameter (unleaded) nozzle 20 is coupled to an unleaded fuel supply 19 by a hose 21. Large-diameter (diesel) nozzle 22 is coupled to a diesel fuel supply 119 by another hose 121. In many cases, both nozzles 20, 22 will be available at a filling station. Nozzle inhibitor 10 in filler neck closure assembly 11 in vehicle 18 functions to block a consumer from inadvertently using small-diameter (unleaded) nozzle 20 to discharge unleaded fuel into a fuel tank filler neck of a vehicle that uses only diesel fuel.

Figure 3:
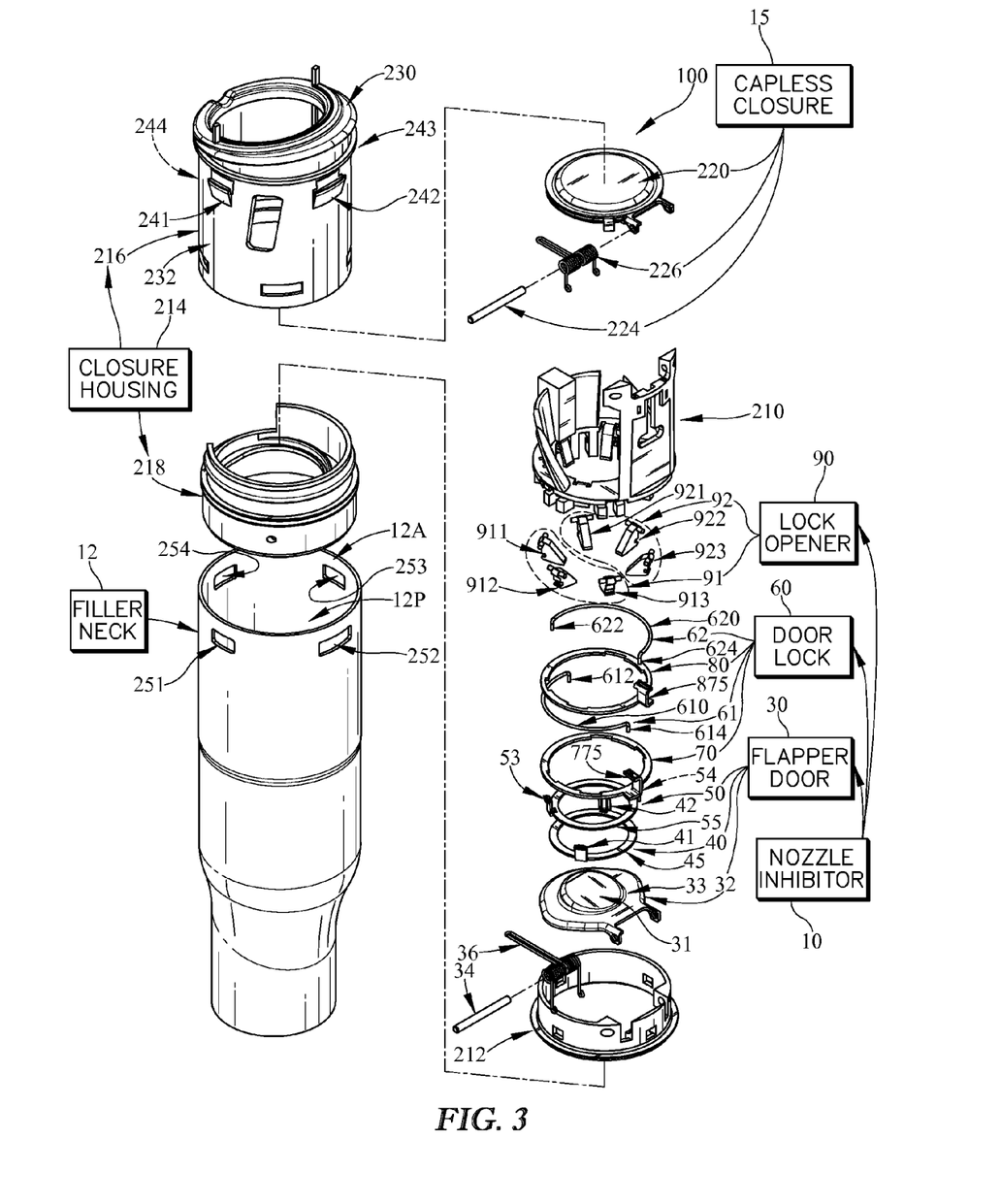
FIG. 3 is an exploded perspective assembly view of an illustrative fill tube and of an illustrative filler neck closure assembly showing that the filler neck closure assembly includes a nozzle inhibitor, a capless outer closure, and a closure housing sized to receive both the fuel nozzle inhibitor and the capless outer closure and showing that the nozzle inhibitor includes a movable flapper door, a flapper door lock, and a door lock opener.
Figure 4:
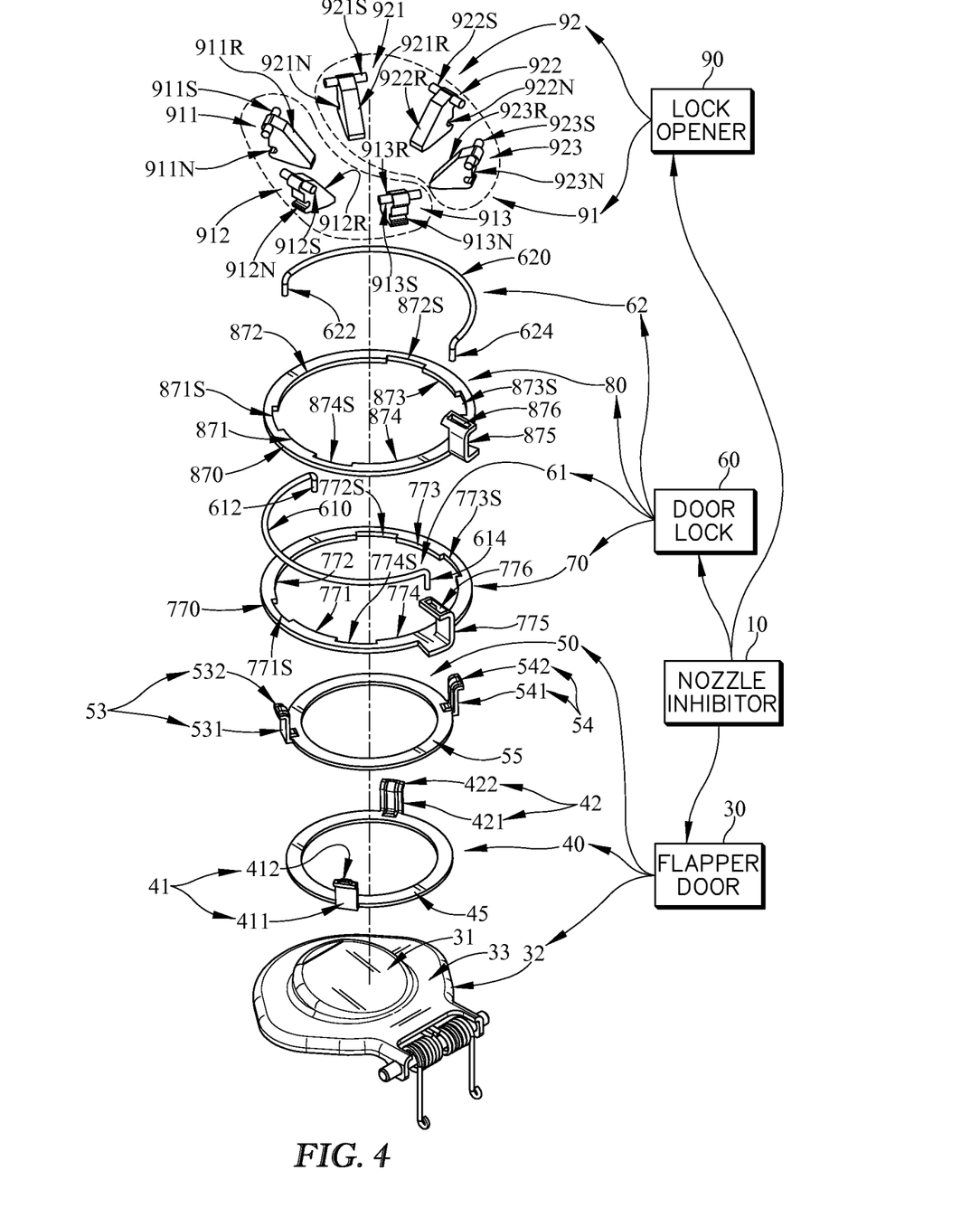
FIG. 4A is a perspective view of the illustrative fuel nozzle inhibitor shown in FIG. 4 assembled to show that the band movers included in the door lock opener extend inwardly from the wire bands included in the door lock into a nozzle receiving space defined by the wire bands.
Figures 5, 5A:
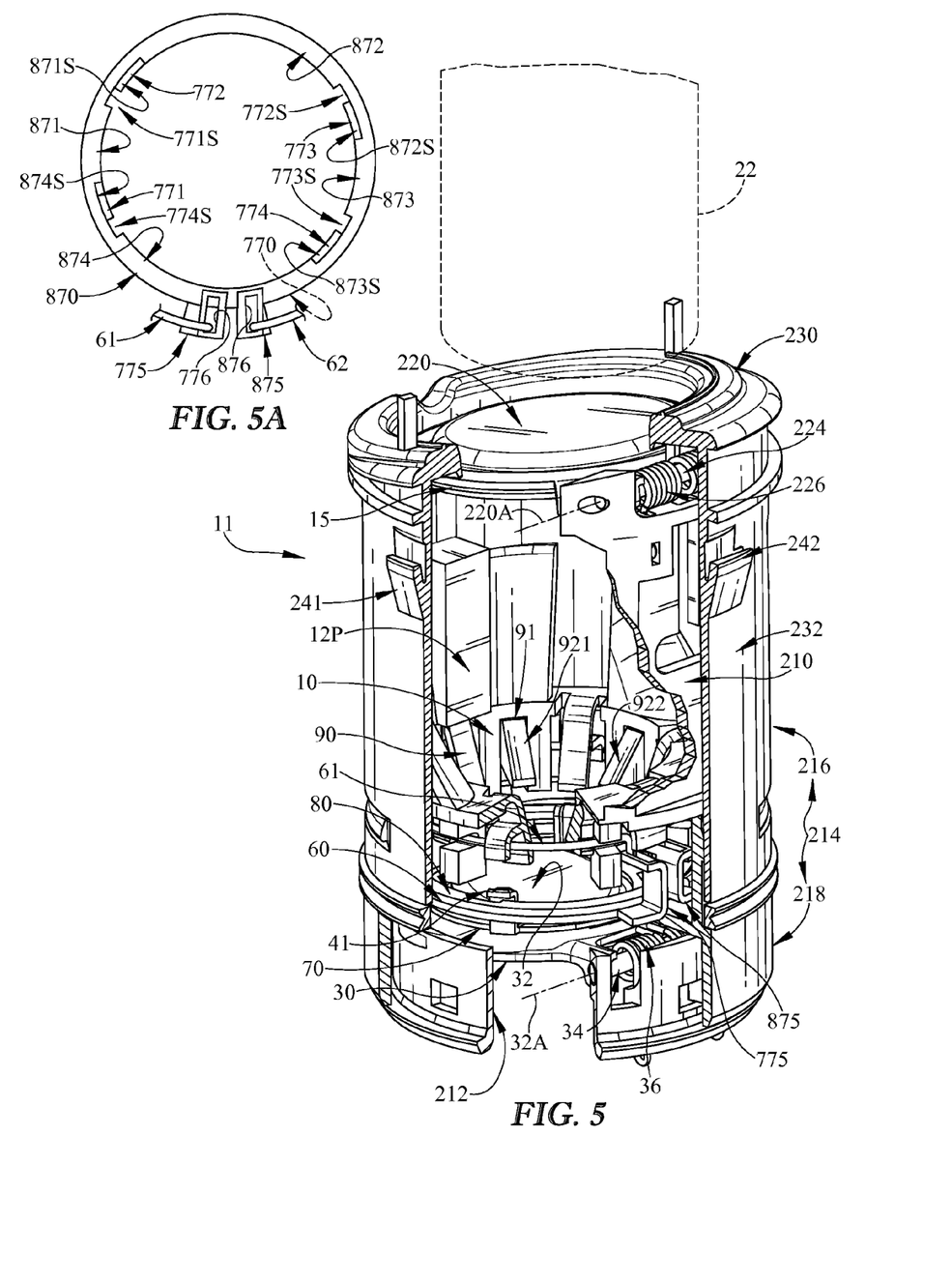
FIG. 5 is a perspective view of the filler neck closure assembly and a tip of a large-diameter (diesel) fuel-dispensing nozzle above the filler neck closure assembly, with portions of the filler neck closure assembly cut away to show a flapper door of the capless outer closure in a closed position and to show the flapper door lock of the fuel nozzle inhibitor in a locked arrangement blocking movement of the flapper door included in the fuel nozzle inhibitor from the closed position toward an open position.
FIG. 5A is a sectional view taken along line 5A-5A of FIG. 5 showing the arrangement of first and second lock rings included in the flapper door lock each in a locked position in which slots in the first and second lock rings are not aligned.
Figures 6, 6A:
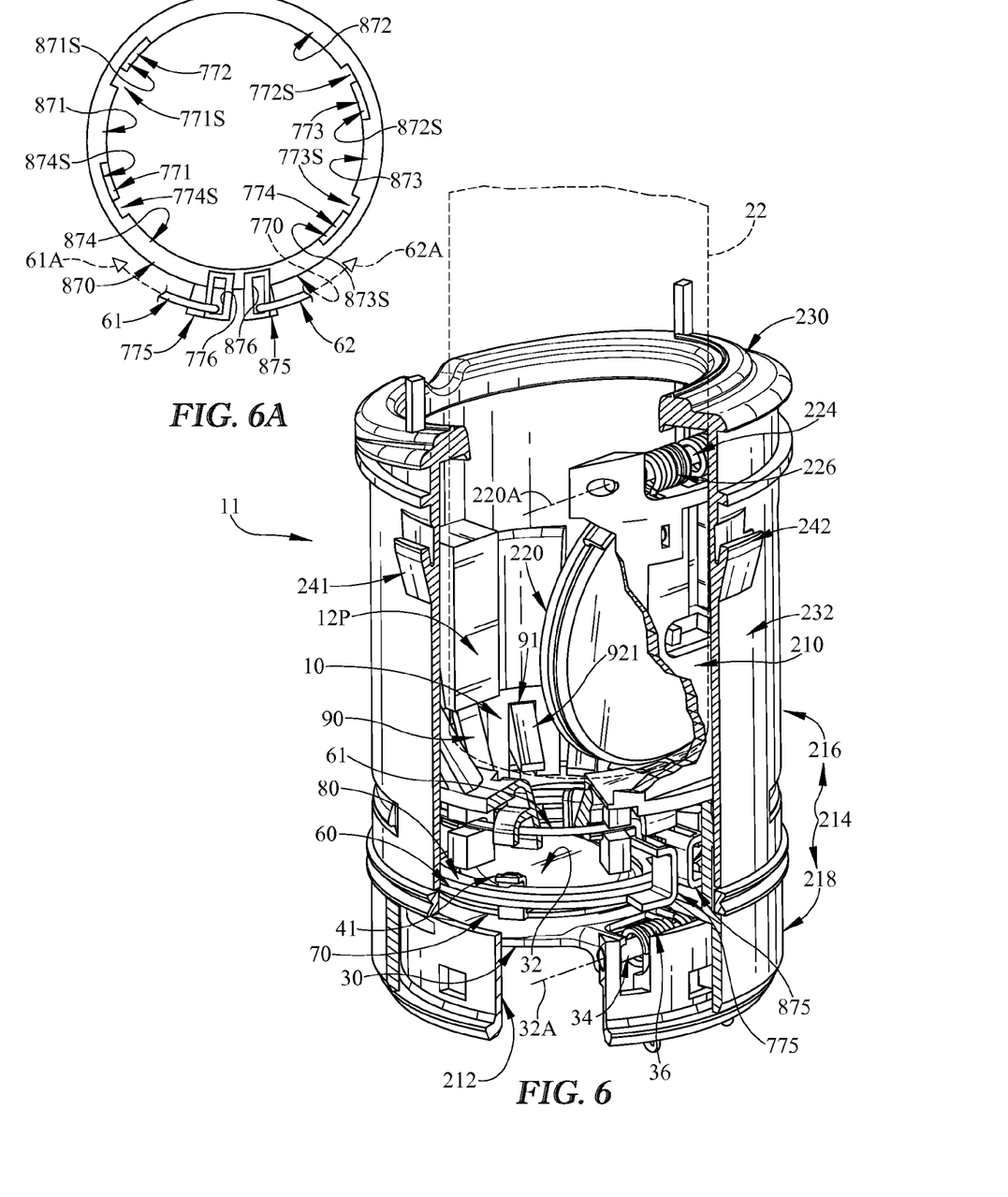
FIG. 6 is a view similar to FIG. 5 of the fuel nozzle closure assembly and a tip of a large-diameter (diesel) fuel nozzle inserted a short distance into the filler neck closure assembly to show the flapper door of the capless outer closure moved to an open position prior to engagement of the large-diameter (diesel) fuel nozzle with the first and second sets of band movers included in the door lock opener as shown in FIG. 6.
FIG. 6A is a sectional view taken along line 6A-6A of FIG. 6 showing the arrangement of first and second lock rings included in the flapper door lock each in a locked position in which slots in the first and second lock rings are not aligned.
Figure 7:
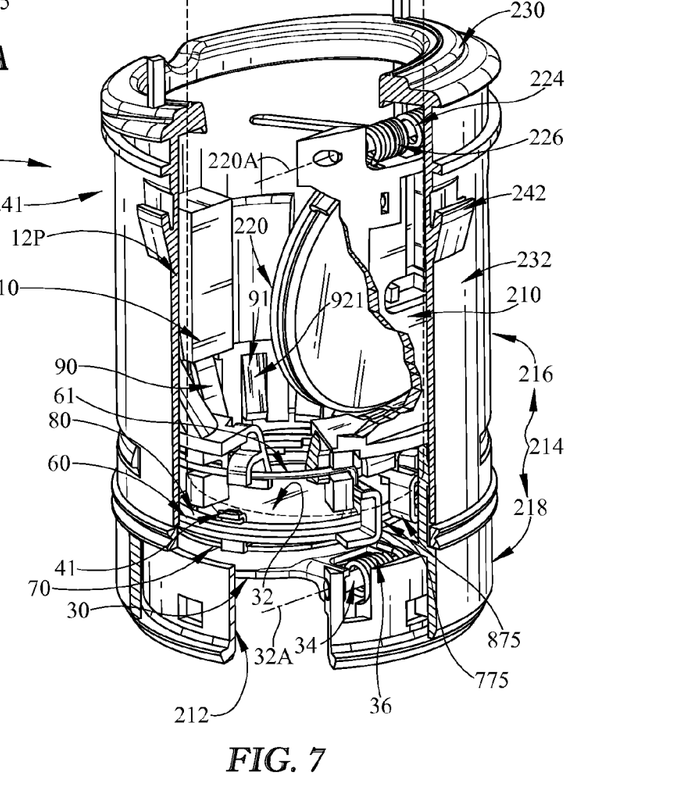
FIG. 7A is a sectional view taken along line 7A-7A of FIG. 7 showing the arrangement of the first and second lock rings included in the flapper door lock each in an unlocked position in which slots in the first and second lock rings are aligned to provide a channel through which retainer tabs coupled to the flapper door can pass during movement of the flapper door from the closed position to the open position.
Figures 8, 8A:
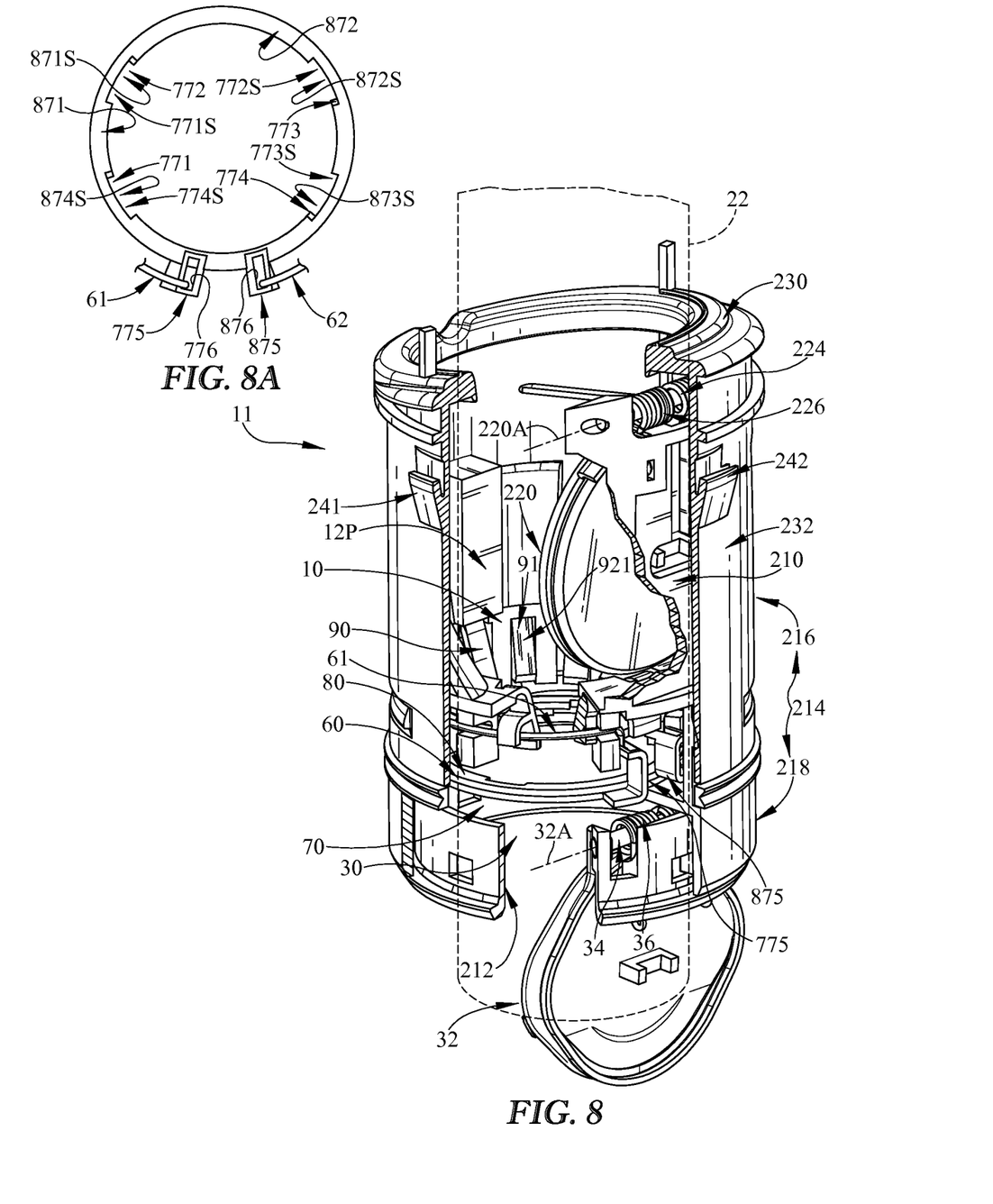
FIG. 8 is a view similar to FIGS. 5-7 of the fuel nozzle closure assembly and a tip of a large-diameter (diesel) fuel nozzle inserted through the filler neck closure assembly to show the flapper door of the nozzle inhibitor moved to an open position by the large-diameter (diesel) fuel nozzle pushing the flapper door downwardly so that the retainer tabs included in the door-position retainers are moved through the aligned slots in the first and second lock rings allowing the large-diameter (diesel) nozzle to dispense fuel into a fuel tank.
FIG. 8A is a sectional view taken along line 8A-8A of FIG. 8 showing that the arrangement of the first and second lock rings included in the flapper door lock remain in the unlocked position with the slots in the first and second lock rings aligned to provide a channel through which retainer tabs coupled to the flapper door can pass during movement of the flapper door from the open position to the closed position upon withdrawal of the large-diameter (diesel) nozzle.

Nozzle inhibitor 10 illustratively includes a flapper door 30, a door lock 60, and a lock opener 90 as shown diagrammatically in FIG. 2 and illustratively in FIGS. 3 and 4. Flapper door 30 is mounted for movement relative to the filler neck 12 from a closed position blocking nozzle-receiving passageway 12P, as shown in FIG. 7, to an open position opening nozzle-receiving passageway 12P as shown in FIG. 8. Door lock 60 moves from a locked position arranged to block movement of flapper door 30, as shown in FIGS. 5 and 6, to an unlocked position arranged to allow movement of flapper door 30 as shown in FIGS. 7 and 8. Door lock opener 90 moves door lock 60 from the locked position to the unlocked position in response to insertion of large-diameter (diesel) nozzle 22 into filler neck 12 as shown in FIG. 7.

Flapper door 30 is mounted for movement between a closed position blocking entry of a fuel-dispensing nozzle into filler neck 12 past nozzle inhibitor 10 and an opened position allowing entry of a fuel-dispensing nozzle into filler neck 12 past nozzle inhibitor 10 as shown in FIG. 8. Flapper door 30 includes a pivotable spring-biased door plate 32, a first door position retainer 40, and a second door position retainer 50 as shown in FIG. 3. Door plate 32 is mounted to pivot on an axle 34 about a door axis 32A and is urged normally to the closed position by a spring 36. First door position retainer 40 is coupled to an outer portion 33 of the door plate 32 and is formed to include upright first and second retainer tabs 41, 42 coupled to a first tab-support ring 45. Second door position retainer 50 is also coupled to outer portion 33 of the door plate 32 and is formed to include upright third and fourth retainer tabs 53, 54 coupled to a second tab-support ring 55 as shown in FIG. 3.

Figure 4A:
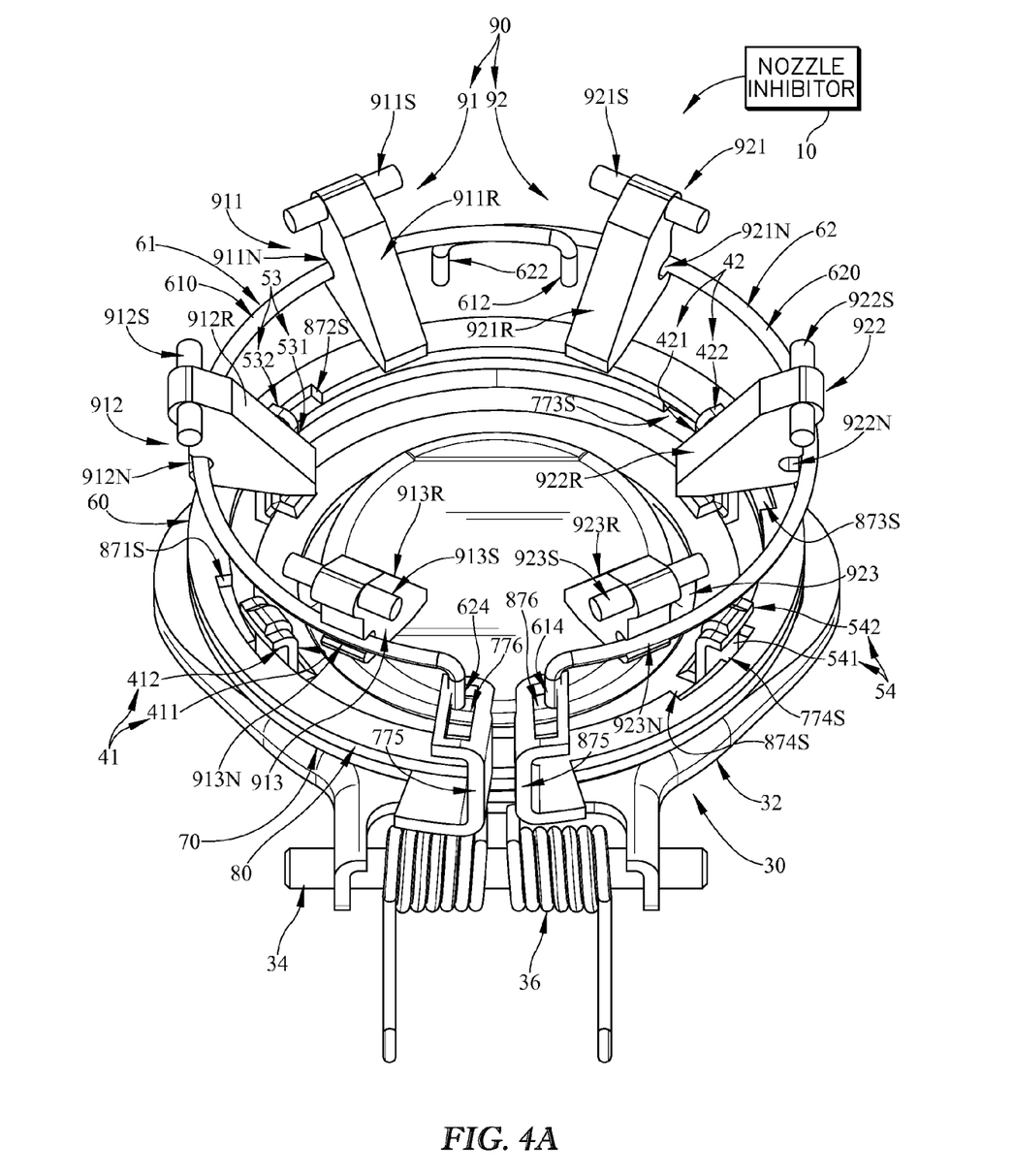

Each illustrative retainer tab 41, 42, 53, 54 has an inverted L-shape as shown in FIG. 4. More particularly, each retainer tab 41, 42, 53, 54 is formed to include a corresponding body 411, 421, 531, 541 that extends generally away from door plate 32 and a corresponding arm 412, 422, 532, 542 that extends over door plate 32 as shown in FIG. 4A. Arms 412, 422, 532, 542 are arranged to engage flapper door lock 60 when flapper door 30 is closed and flapper door lock 60 is in the locked position blocking movement of flapper door 30 from the closed position to the open position.

Flapper door lock 60 that is arranged around a central axis 10A extending through filler neck closure assembly 11 as shown in FIG. 4. Flapper door lock 60 includes rotatable first and second lock rings 70, 80 positioned to lie above the pivotable spring-biased door plate 32 to interact with the upright first, second, third, and fourth retainer tabs 41, 42, 53, 54 of the door position retainers 40, 50. Each lock ring 70, 80 can be rotated through an acute angle about central axis 10A by a door lock opener 90 in accordance with the present disclosure as suggested by arrows 70A, 80A in FIG. 7A.

Lock rings 70, 80 move between a locked position and an unlocked position. In the locked position, lock rings 70, 80 are arranged to block movement of retainer tabs 41, 42, 53, 54 in door position retainers 40, 50 to thereby block movement of the door plate 32 from the closed position to the opened position as shown in FIGS. 5 and 6. In the unlocked position, lock rings 70, 80 are arranged to free each of those retainer tabs 41, 42, 53, 54 to thereby free the pivotable spring-biased door plate 32 to be moved from the closed position to the open position as shown in FIGS. 7 and 8. Lock rings 70, 80 are moved from the locked position to the unlocked position by a large-diameter (diesel) fuel-dispensing nozzle 22 moving inwardly into filler neck 12 to engage lock opener 90 as shown in FIGS. 7 and 8.

First lock ring 70 is formed to include door-motion blockers 771, 772, 773, 774 extending inwardly from a frame ring 770 as shown in FIG. 4A. The door-motion blockers 771, 772, 773, 774 are arranged to block the retainer tabs 41, 42, 53, 54 from movement relative to the first lock ring 70 when the first lock ring 70 is arranged in the locked position to thereby block pivotable movement of the door plate 32 to the opened position. First lock ring 70 is also formed to include a first plurality of tab-passing slots 771S, 772S, 773S, 774S arranged between the door-motion blockers 771, 772, 773, 774 of the first lock ring 70. First lock ring 70 is further formed to include a mover strut 775 that extends upwardly from frame ring 770 as shown in FIG. 4A.

Second lock ring 80 is formed to include door-motion blockers 871, 872, 873, 874 extending inwardly from a frame ring 870 as shown in FIG. 4A. The door-motion blockers 871, 872, 873, 874 are arranged to block retainer tabs 41, 42, 53, 54 when second lock ring 80 is arranged in the locked position to block pivotable movement of door plate 32 to the opened position. Second lock ring 80 is also formed to include a second plurality of slots 871S, 872S, 873S, 874S arranged between door-motion blockers 871, 872, 873, 874 of second lock ring 80. Second lock ring 80 is further formed to include a mover strut 875 that extends upwardly from frame ring 870 as shown in FIG. 4A.

Figure 7A:
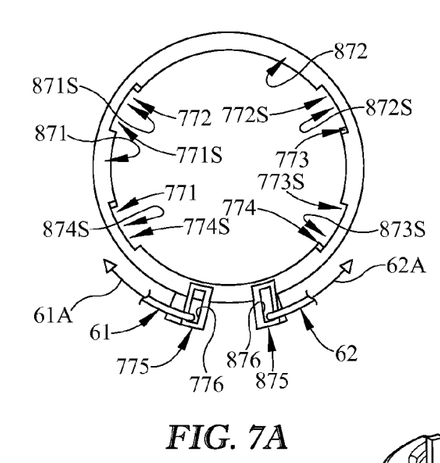

When both first lock ring and second lock ring 70, 80 are moved to the unlocked position, first and second plurality of slots 771S-774S, 871S-874S are aligned with each other as shown in FIGS. 7A and 8A. First and second plurality of tab-passing slots 771S-774S, 871S-874S cooperate to provide means for providing channels through which the retainer tabs 41, 42, 53, 54 can pass without engaging any of door-motion blockers 771-774 and 871-874 after first and second lock rings 70, 80 are rotated to assume the unlocked positions to free door plate 32 in the flapper door 30 to be moved from the closed position to the opened position Flapper door lock 60 further includes a first ring position changer 61 and a second ring position changer 62 as shown in FIG. 4. First ring position changer 61 is coupled to first lock ring 70 and second ring position changer 62 is coupled to second lock ring 80 to move the lock rings 70, 80 from the locked position to the unlocked position when a large-diameter (diesel) nozzle 22 is inserted into nozzle inhibitor 10 as shown in FIGS. 7 and 8.

First ring position changer 61 comprises an elastic deformable first wire band 610, a first band anchor 612, and a first ring rotator 614 as shown in FIG. 4. Deformable first wire band 610 is expandable to change from a normal undeformed mode to a temporary deformed mode. First band anchor 612 is coupled to one end of the first wire band 610 to support the first wire band 610 for pivotable movement about a first pivot axis 61A in response to expansion of the first wire band 610 from the undeformed mode to the deformed mode. First ring rotator 614 is coupled to an opposite end of the first wire band 610. The first ring rotator 614 extends into a slot 776 formed in mover strut 775 included in first lock ring 70 to couple first ring position changer 61 to first lock ring 70 so that first ring rotator 614 imparts rotation to the first lock ring 70 to cause the first lock ring 70. In response to expansion of the elastic deformable first wire band 610 to assume the temporary deformed mode, the first lock ring 70 rotates about the central axis 10A in a counterclockwise direction from the locked position to the unlocked position as suggested by arrow 61A in FIG. 7A.

Second ring position changer 62 comprises an elastic deformable second wire band 620, a second band anchor 622, and a second ring rotator 624. Elastic deformable second wire band 620 is expandable to change from a normal undeformed mode to a temporary deformed mode. Second band anchor 622 is coupled to one end of the second wire band 620 to support the second wire band 620 for pivotable movement about a second axis 62A in response to expansion of the second wire band 620 from the undeformed mode to the deformed mode. Second ring rotator 624 is coupled to an opposite end of the second wire band 620. The second ring rotator 624 extends into a slot 876 formed in mover strut 875 included in second lock ring 80 to couple second ring position changer 62 to second lock ring 80 so that second ring rotator 624 imparts rotation to the second lock ring 80. In response to expansion of the elastic deformable second wire band 620 to assume the temporary deformed mode, the second lock ring 80 rotates about the central axis 10A in a clockwise direction from the locked position to the unlocked position as suggested by arrow 62 in FIG. 7A.

Door lock opener 90 is arranged to extend into a nozzle-receiving space 10S provided between the elastic deformable first and second wire bands 610, 620 included in flapper door lock 60 as shown in FIG. 4A. The door lock opener 90 includes a first set 91 of three band movers 911, 912, 913 that are mounted on an upper mount 210 for independent pivotable movement relative to one another and to the first wire band 610. The first set 91 of three band movers 911, 922, 913 are configured to expand the first wire band 610 to the temporary deformed mode to move the first ring rotator 614 relative to filler neck 12 to rotate the first lock ring 70 about central axis 10A in the counterclockwise direction from the locked position to the unlocked position in response to movement of large-diameter fuel-dispensing nozzle 22 in filler neck 12 into nozzle-receiving space 10S.

The door lock opener 90 also includes a second set 92 of three band movers 921, 922, 923 that are mounted on upper mount 210 for independent pivotable movement relative to one another and to the second wire band 620. The second set 92 of three band movers 921, 922, 923 are configured to expand the second wire band 620 to the temporary deformed mode to move the second ring rotator 624 relative to filler neck 12 to rotate the second lock ring 80 about central axis 10A in the clockwise direction from the locked position to the unlocked position in response to movement of large-diameter fuel-dispensing nozzle 22 in filler neck 12 into nozzle-receiving space 10S.

In the illustrative embodiment, each band mover 911, 912, 913, 921, 922, 923 forms a corresponding pivot shaft 911S, 912S, 913S, 921S, 922S, 923S, band-receiving notch 911N, 912N, 913N, 921N, 922N, 923N, and sloped ramp 911R, 912R, 913R, 921R, 922R, 923R as shown in FIG. 4A. Each pivot shaft 911S, 912S, 913S, 921S, 922S, 923S is received in coupled to upper mount 210 to support a corresponding band mover pivot shaft 911S, 912S, 913S, 921S, 922S, 923S for movement relative to the upper mount 210. Each band-receiving notch 911N, 912N, 913N, 921N, 922N, 923N faces away from the central axis 10A and is sized to receive a portion of the first or second wire band 610, 620. Each sloped ramp 911R, 912R, 913R, 921R, 922R, 923R extends inwardly in a radial direction from the upper mount 210 toward the central axis 10A and downwardly toward the movable flapper door 30.

Capless outer closure 15 illustratively includes a capless plate 220 coupled to the upper mount 210 to pivot from a closed position to an open position about a plate axis 220A as shown in FIGS. 3 and 5. In the closed position, capless plate 220 extends over an entry aperture 12A formed by the filler neck 12 and blocks dirt from entering filler neck 12 as suggested in FIG. 5. In the closed position, capless plate 220 is pushed into passageway 12P, as shown in FIG. 6, and allows a large-diameter (diesel) nozzle 22 to engage nozzle inhibitor 10 to unlock/open nozzle inhibitor 10 so that the large-diameter (diesel) nozzle 22 can dispense diesel fuel into fuel tank 14 as suggested in FIG. 8. Capless plate 220 is mounted to pivot on an axle 224 and is urged normally to the closed position by a spring 226. In other embodiments, capless outer closure 15 is replaced by a traditional threaded fill tube closed by a corresponding threaded fuel (gas) cap.

Filler neck closure assembly 11 further includes upper mount 210 and lower mount 212 as shown in FIG. 3. Upper mount 210 extends around central axis 10A and supports band movers 911, 912, 913, 921, 922, 923 for movement about their respective axes relative to filler neck 12. Lower mount 212 extends around central axis 10A and supports flapper door 30 for movement between the closed position and the open position.

Filler neck closure assembly 11 further includes a closure housing 214 as shown in FIG. 3. Closure housing 214 receives and supports nozzle inhibitor 10, capless outer closure 15, upper mount 210, and lower mount 212 as suggested in FIGS. 3 and 5-8. Closure housing 214 is adapted to be mounted in filler neck 12 to hold nozzle inhibitor 10 and capless outer closure 15 in a predetermined position relative to filler neck 12. Closure housing 214 illustratively includes an upper sleeve 216 and a lower sleeve 218 that mates with upper sleeve 216.

Upper sleeve 216 included in closure housing 214 includes a mouth ring 230, a side wall 232 that extends down from mouth ring 230, and a plurality of tabs 241, 242, 243, 244 as shown in FIG. 3. Mouth ring 230 extends around an entry aperture 231 through which a nozzle moves to enter filler neck 12. Plurality of tabs 241, 242, 243, 244 extend outwardly from side wall 232 and are received in slots 251, 252, 253, 254 formed in filler neck 12 when filler neck closure assembly 11 is inserted into filler neck 12 so that filler neck closure assembly 11 is held in place relative to filler neck 12.

Only a large-diameter (diesel) fuel-dispensing nozzle 22 can actuate door lock opener 90 in accordance with the present disclosure to pivot first wire band 610 coupled to first lock ring 70 in a counterclockwise direction and to pivot second wire band 620 coupled to second lock ring 80 in a clockwise direction. Rotation of both first lock ring 70 and second lock ring 80 causes first and second plurality of slots 771S-774S, 871S-874S formed in the lock rings 70, 80 to align so that retainer tabs 41, 42, 53, 54 can move past flapper door lock 60 and flapper door 30 can be moved from the closed position to the opened position to thereby allow passage of large-diameter fuel-dispensing nozzle 22 past an opened flapper door 30 toward fuel tank 14.

The dual-action flapper door lock 60 prevents a relatively smaller-diameter (unleaded) fuel-dispensing nozzle 20 from tricking the flapper door lock 60 into unlocking. The relatively smaller small-diameter (unleaded) fuel-dispensing nozzle 20 is not wide enough at the tip to spread apart all of the band movers 911, 912, 913, 921, 922, 923 included in the door lock opener 90 to expand each of first and second wire bands 610, 620 in flapper door lock 60 and cause door-motion blockers 771-774, 871-874 to free door-position retainer tabs 41, 42, 53, 54 included in the flapper door 30. As such, door-motion blockers 771-774, 871-874 continue to block (i.e., confront) the door-position retainer tabs 41, 42, 53, 54 to retain flapper door 30 in a closed position blocking passage of small-diameter nozzle 20 through filler neck closure assembly 11 and admission of small-diameter nozzle 20 past nozzle inhibitor 10 toward fuel tank 14.

The invention claimed is:

1. A filler neck closure assembly associated with a vehicle fuel tank filler neck, the assembly comprising
   a lower mount sized to be located in a filler neck and arranged to extend around a central axis of a fuel-conducting passageway formed in the filler neck, and
   inhibitor means for preventing insertion of a small-diameter unleaded fuel-dispensing nozzle into the fuel-conducting passageway while allowing insertion of a large-diameter diesel fuel-dispensing nozzle into the fuel-conducting passageway formed in the filler neck,
   wherein the inhibitor means includes a flapper door coupled to the lower mount for movement relative to the mount and the filler neck to open and close the fuel-conducting passageway, a flapper door lock including a first lock ring mounted for rotation about the central axis in a first direction from a flapper door-locking position blocking movement of the flapper door relative to the filler neck to a flapper door-unlocking position allowing movement of the flapper door from the closed position to the opened position and a second lock ring mounted for rotation about the central axis in a second direction, opposite the first direction, from a flapper door-locking position blocking movement of the flapper door relative to the filler neck to a flapper door-unlocking position allowing movement of the flapper door from the closed position to the opened position, and a door lock opener coupled to the flapper door lock, the door lock opener configured to (1) impart rotation to the first lock ring to rotate the first lock ring in the first direction from the flapper door-locking position to the flapper door-unlocking position and (2) impart rotation to the second lock ring to rotate the second lock ring in the second direction from the flapper door-locking position to the flapper door-unlocking position in response to exposure to the large-diameter diesel fuel-dispensing nozzle during movement of the large-diameter diesel fuel-dispensing nozzle in the filler neck toward the flapper door.

2. The filler neck closure assembly of claim 1, wherein the first lock ring includes a rotatable frame ring and a door-motion blocker coupled to the rotatable frame ring to rotate therewith, the flapper door includes a door plate mounted in the fuel-conducting passageway in the filler neck for movement between a closed position closing the fuel-conducting passageway and an opened position opening the fuel-conducting passageway and a door-position retainer coupled to the door plate to move therewith, and the door-position retainer is arranged to confront and mate with the door-motion blocker included in the first lock ring upon movement of the first lock ring to the flapper door-locking position to block movement of the door plate from the closed position to the opened position and to separate from the door-motion blocker included in the first lock ring upon rotation of the first lock ring about the central axis to the flapper door-unlocking position to free the door plate to be moved from the closed position to the opened position.

3. The filler neck closure assembly of claim 1, wherein the first lock ring and the second lock ring each include a rotatable frame ring and a door-motion blocker coupled to the rotatable frame ring to rotate therewith, the flapper door includes a door plate mounted in the fuel-conducting passageway in the filler neck for movement between a closed position closing the fuel-conducting passageway and an opened position opening the fuel-conducting passageway and a door-position retainer coupled to the door plate to move therewith, and the door-position retainer is arranged to confront and mate with the door-motion blockers included in the first lock ring and the second lock ring upon movement of the first lock ring and the second lock ring to the flapper door-locking position to block movement of the door plate from the closed position to the opened position and to separate from the door-motion blockers included in the first lock ring and the second lock ring to separate from the door-motion blocker included in the first lock ring upon rotation of the first lock ring about the central axis to the flapper door-unlocking position to free the door plate to be moved from the closed position to the opened position.

4. The filler neck closure assembly of claim 3, wherein each door-position retainer includes a first retainer tab having an inverted L-shape coupled to the door plate and a second retainer tab coupled to the door plate having an inverted L-shape coupled to the door plate.

5. The filler neck closure assembly of claim 1, wherein the door lock opener includes a plurality of movers mounted to pivot independent of one another relative to the filler neck during movement of the large-diameter diesel fuel-dispensing nozzle in the filler neck toward the flapper door.

6. The filler neck closure assembly of claim 5, wherein the flapper door lock includes a first elastic deformable wire band coupled to the first lock ring, the plurality of movers included in the door lock opener are arranged to engage the first elastic deformable wire band and to expand the first elastic deformable wire band from an undeformed mode to a temporary deformed mode during movement of the large-diameter diesel fuel-dispensing nozzle in the filler neck toward the flapper door, and the expansion of the first elastic deformable wire band to the temporary deformed mode causes movement of the first lock ring about the central axis in the first direction from the flapper door-locking position to the flapper door-unlocking position.

7. The filler neck closure assembly of claim 6, wherein the flapper door lock includes a second elastic deformable wire band coupled to the second lock ring, the plurality of movers included in the door lock opener are arranged to engage the second elastic deformable wire band and to expand the second elastic deformable wire band from an undeformed mode to a temporary deformed mode during movement of the large-diameter diesel fuel-dispensing nozzle in the filler neck toward the flapper door, and the expansion of the second elastic deformable wire band to the temporary deformed mode causes movement of the second lock ring about the central axis in the second direction from the flapper door-locking position to the flapper door-unlocking position.

8. A filler neck closure assembly associated with a vehicle fuel tank filler neck, the assembly comprising
  a lower mount sized to be located in a filler neck and arranged to extend around a central axis of a fuel-conducting passageway formed in the filler neck, and
  a nozzle inhibitor including a flapper door coupled to the lower mount for movement relative to the mount and the filler neck to open and close the fuel-conducting passageway, a flapper door lock including a first lock ring mounted for rotation about the central axis in a first direction from a flapper door-locking position blocking movement of the flapper door relative to the filler neck to a flapper door-unlocking position allowing movement of the flapper door from the closed position to the opened position and a second lock ring mounted for rotation about the central axis in a second direction opposite the first direction from a flapper door-locking position blocking movement of the flapper door relative to the filler neck to a flapper door-unlocking position allowing movement of the flapper door from the closed position to the opened position, and a door lock opener coupled to the flapper door lock and configured to (1) impart rotation to the first lock ring to rotate the first lock ring in the first direction from the flapper door-locking position to the flapper door-unlocking position and (2) impart rotation to the second lock ring to rotate the second lock ring in the second direction from the flapper door-locking position to the flapper door-unlocking position in response to insertion of a large-diameter diesel fuel-dispensing nozzle into the nozzle inhibitor.

9. The filler neck closure assembly of claim 8, wherein the flapper door includes a door plate mounted in the fuel-conducting passageway in the filler neck for movement between a closed position closing the fuel-conducting passageway and an opened position opening the fuel-conducting passageway and a door-position retainer that extends away from the door plate, the first lock ring and the second lock ring are arranged to block movement of the door plate from the closed position to the opened position when the first lock ring and the second lock ring are in the flapper door-locking position, and the first lock ring and the second lock ring are arranged to allow movement of the door plate from the closed position to the opened position when the first lock ring and the second lock ring are in the flapper door-unlocking position.

10. The filler neck closure assembly of claim 8, wherein the first lock ring and the second lock ring each include a rotatable frame ring and a door-motion blocker coupled to the rotatable frame ring to rotate therewith, the flapper door includes a door plate mounted in the fuel-conducting passageway in the filler neck for movement between a closed position closing the fuel-conducting passageway and an opened position opening the fuel-conducting passageway and a door-position retainer coupled to the door plate to move therewith, and the door-position retainer is arranged to confront the door-motion blockers included in the first lock ring and the second lock ring upon movement of the first lock ring and the second lock ring to the flapper door-locking position to block movement of the door plate from the closed position to the opened position and is arranged out of confrontation with the door-motion blockers included in the first lock ring and the second lock ring upon rotation of the first lock ring and the second lock ring about the central axis to the flapper door-unlocking position.

11. The filler neck closure assembly of claim 10, wherein each door-position retainer includes a first retainer tab having an inverted L-shape coupled to the door plate and a second retainer tab coupled to the door plate having an inverted L-shape coupled to the door plate.

12. The filler neck closure assembly of claim 11, wherein the flapper door lock includes a second elastic deformable wire band coupled to the second lock ring, the plurality of movers included in the door lock opener are arranged to engage the second elastic deformable wire band and to expand the second elastic deformable wire band from an undeformed mode to a temporary deformed mode during movement of the large-diameter diesel fuel-dispensing nozzle in the filler neck toward the flapper door, and the expansion of the second elastic deformable wire band to the temporary deformed mode causes movement of the second lock ring about the central axis in the second direction from the flapper door-locking position to the flapper door-unlocking position.

13. The filler neck closure assembly of claim 8, wherein the flapper door lock includes a first elastic deformable wire band coupled to the first lock ring, the door lock opener includes a plurality of movers mounted to pivot and are arranged to expand the first elastic deformable wire band from an undeformed mode to a temporary deformed mode in response to insertion of a large-diameter diesel fuel-dispensing nozzle into the nozzle inhibitor, and the expansion of the first elastic deformable wire band to the temporary deformed mode causes movement of the first lock ring about the central axis in the first direction from the flapper door-locking position to the flapper door-unlocking position.

14. A nozzle inhibitor adapted for use in a filler neck forming a fuel-conducting passageway, the nozzle inhibitor comprising
a flapper door adapted to be mounted for movement in the filler neck from a closed position to an opened position to open and close the fuel-conducting passageway of the filler neck,
a flapper door lock including a first lock ring mounted for rotation about a central axis in a first direction from a flapper door-locking position blocking movement of the flapper door from the closed position to the opened position to a flapper door-unlocking position allowing movement of the flapper door from the closed position to the opened position and a second lock ring mounted for rotation about the central axis in a second direction opposite the first direction from a flapper door-locking position blocking movement of the flapper door relative to the filler neck to a flapper door-unlocking position allowing movement of the flapper door from the closed position to the opened position, and
a door lock opener coupled to the flapper door lock, configured to impart rotation to the first lock ring to rotate the first lock ring in the first direction from the flapper door-locking position to the flapper door-unlocking position in response to insertion of a large-diameter diesel fuel-dispensing nozzle into the nozzle inhibitor, and configured to impart rotation to the second lock ring to rotate the second lock ring in the second direction from the flapper door-locking position to the flapper door-unlocking position in response to insertion of a large-diameter diesel fuel-dispensing nozzle into the nozzle inhibitor.

15. The nozzle inhibitor of claim 14, wherein the flapper door includes a door plate mounted in the fuel-conducting passageway in the filler neck for movement between a closed position closing the fuel-conducting passageway and an opened position opening the fuel-conducting passageway and a door-position retainer that extends away from the door plate, the first lock ring and the second lock ring are arranged to block movement of the door plate from the closed position to the opened position when the first lock ring and the second lock ring are in the flapper door-locking position, and the first lock ring and the second lock ring are arranged to allow movement of the door plate from the closed position to the opened position when the first lock ring and the second lock ring are in the flapper door-unlocking position.

16. The filler neck closure assembly of claim 14, wherein the first lock ring and the second lock ring each include a rotatable frame ring and a door-motion blocker coupled to the rotatable frame ring to rotate therewith, the flapper door includes a door plate mounted in the fuel-conducting passageway in the filler neck for movement between a closed position closing the fuel-conducting passageway and an opened position opening the fuel-conducting passageway and a door-position retainer coupled to the door plate to move therewith, and the door-position retainer is arranged to confront the door-motion blockers included in the first lock ring and the second lock ring upon movement of the first lock ring and the second lock ring to the flapper door-locking position to block movement of the door plate from the closed position to the opened position and to move out of confrontation with the door-motion blockers included in the first lock ring and the second lock ring upon rotation of the first lock ring and the second lock ring about the central axis to the flapper door-unlocking position.

17. The filler neck closure assembly of claim 14, wherein the flapper door lock includes a first elastic deformable wire band coupled to the first lock ring, the door lock opener includes a plurality of movers mounted to pivot and are arranged to expand the first elastic deformable wire band from an undeformed mode to a temporary deformed mode in response to insertion of a large-diameter diesel fuel-dispensing nozzle into the nozzle inhibitor, and the expansion of the first elastic deformable wire band to the temporary deformed mode causes movement of the first lock ring about the central axis in the first direction from the flapper door-locking position to the flapper door-unlocking position.

18. A nozzle inhibitor adapted for use in a filler neck forming a fuel-conducting passageway, the nozzle inhibitor comprising a flapper door adapted to be mounted for movement in the filler neck from a closed position to an opened position to open and close the fuel-conducting passageway of the filler neck, a flapper door lock including a first lock ring mounted for rotation about a central axis in a first direction from a flapper door-locking position blocking movement of the flapper door from the closed position to the opened position to a flapper door-unlocking position allowing movement of the flapper door from the closed position to the opened position and a second lock ring mounted for rotation about the central axis in a second direction, opposite the first direction, from a flapper door-locking position blocking movement of the flapper door relative to the filler neck to a flapper door-unlocking position allowing movement of the flapper door from the closed position to the opened position.

19. The nozzle inhibitor of claim 18, wherein the first lock ring and the second lock ring each include a rotatable frame ring and a door-motion blocker coupled to the rotatable frame ring to rotate therewith, the flapper door includes a door plate mounted in the fuel-conducting passageway in the filler neck for movement between a closed position closing the fuel-conducting passageway and an opened position opening the fuel-conducting passageway and a door-position retainer coupled to the door plate to move therewith, and the door-position retainer is arranged to confront and mate with the door-motion blockers included in the first lock ring and the second lock ring upon movement of the first lock ring and the second lock ring to the flapper door-locking position to block movement of the door plate from the closed position to the opened position and to separate from the door-motion blockers included in the first lock ring and the second lock ring to separate from the door-motion blocker included in the first lock ring upon rotation of the first lock ring about the central axis to the flapper door-unlocking position to free the door plate to be moved from the closed position to the opened position.

20. The nozzle inhibitor of claim 18, wherein the flapper door lock includes a first elastic deformable wire band coupled to the first lock ring and a second elastic deformable wire band coupled to the second lock ring, expansion of the first elastic deformable wire band to a temporary deformed mode causes movement of the first lock ring about the central axis in the first direction from the flapper door-locking position to the flapper door-unlocking position, and expansion of the second elastic deformable wire band to a temporary deformed mode causes movement of the second lock ring about the central axis in the second direction from the flapper door-locking position to the flapper door-unlocking position.

* * * * *